（12）United States Patent
Fujimoto et al.

(10) Patent No.: US 10,481,784 B2
(45) Date of Patent: Nov. 19, 2019

(54) DISPLAY DEVICE AND NON-TRANSITORY COMPUTER-READABLE RECORDING MEDIUM HAVING DISPLAY CONTROL PROGRAM RECORDED THEREON

(71) Applicant: KYOCERA Document Solutions Inc., Osaka (JP)

(72) Inventors: Norie Fujimoto, Osaka (JP); Takanori Miyamoto, Osaka (JP); Naoto Hanada, Osaka (JP); Takushi Dandoko, Osaka (JP)

(73) Assignee: KYOCERA Documents Solutions Inc., Tamatsukuri, Chuo-ku, Osaka (JP)

( * ) Notice: Subject to any disclaimer, the term of this patent is extended or adjusted under 35 U.S.C. 154(b) by 288 days.

(21) Appl. No.: 15/467,216

(22) Filed: Mar. 23, 2017

(65) Prior Publication Data

US 2017/0285900 A1    Oct. 5, 2017

(30) Foreign Application Priority Data

Mar. 30, 2016 (JP) .................................. 2016-069366
Jul. 19, 2016 (JP) .................................. 2016-141754

(51) Int. Cl.
G06F 3/0485 (2013.01)
G06F 3/0488 (2013.01)
H04N 1/00 (2006.01)

(52) U.S. Cl.
CPC .......... *G06F 3/0485* (2013.01); *G06F 3/0488* (2013.01); *H04N 1/00* (2013.01);
(Continued)

(58) Field of Classification Search
CPC ............................ G06F 3/0485; G06F 3/0488
See application file for complete search history.

(56) References Cited

U.S. PATENT DOCUMENTS 8,504,940 B1* 8/2013 Fioravanti ............. G06F 3/0485
345/473
2003/0169293 A1* 9/2003 Savage ................. G06F 3/0481
715/762

(Continued)

FOREIGN PATENT DOCUMENTS

JP    H04-234789 A    8/1992

OTHER PUBLICATIONS

Extended European Search Report dated Aug. 3, 2017, dated in the corresponding European Patent Application No. 17163083.3.

*Primary Examiner* — Amy Ng
*Assistant Examiner* — Samuel Shen
(74) *Attorney, Agent, or Firm* — IP Business Solutions, LLC

(57) ABSTRACT

A display device includes a display section and a control unit including a processor. The control unit displays, upon deciding that an image to be displayed in the display section is a scrollable image larger than a predetermined display region of the display section, and an entirety of which can be displayed in the display region by scrolling the image in a vertical or horizontal direction in a display screen of the display section, a portion of the scrollable image in the display region, the portion being shifted in the vertical direction or horizontal direction to a predetermined position away from a head position, and then displays, in the display region, the scrollable image scrolled until the head position thereof appears at an end of the display region in a direction of the shifting.

11 Claims, 14 Drawing Sheets

(52) U.S. Cl.
CPC ...... *H04N 1/00411* (2013.01); *H04N 1/00427* (2013.01); *H04N 1/00458* (2013.01); *H04N 2201/0094* (2013.01)

(56) References Cited

U.S. PATENT DOCUMENTS

| | | | |
|---|---|---|---|
| 2010/0138776 A1* | 6/2010 | Korhonen | G06F 3/0485 715/786 |
| 2012/0011464 A1 | 1/2012 | Hayashi et al. | |
| 2012/0099127 A1* | 4/2012 | Nagata | G06F 3/1204 358/1.13 |
| 2012/0221969 A1* | 8/2012 | Sansen | G06F 3/0482 715/784 |
| 2013/0055150 A1* | 2/2013 | Galor | G09G 5/34 715/784 |
| 2014/0149923 A1* | 5/2014 | Horiike | G06F 3/0488 715/784 |
| 2016/0179798 A1* | 6/2016 | Franks | G06F 3/0483 715/739 |
| 2016/0328108 A1* | 11/2016 | Li | G06F 3/0485 |
| 2017/0124988 A1* | 5/2017 | Mitsui | G09G 5/34 |
| 2018/0300162 A1* | 10/2018 | Kotlicki | G06F 9/453 |

\* cited by examiner

Fig.3

| JOB CONFIRMATION SCREEN | | | | | |
|---|---|---|---|---|---|
| NUM-BER | RECEPTION TIME | TYPE | JOB NAME | USER NAME | STATUS |
| 0001 | 13:38 | PRINTING BY PRINTER | doc20131021133807 | AAAAA | COMP-LETED |
| 0002 | 13:52 | PRINTING BY PRINTER | doc20131021135209 | AAAAA | COMP-LETED |
| 0003 | 13:59 | PRINTING BY PRINTER | doc20131021135911 | BBBBB | ERROR |
| 0004 | 14:05 | PRINTING BY PRINTER | doc20131021140513 | CCCCC | ERROR |
| | | | | | CLOSE |

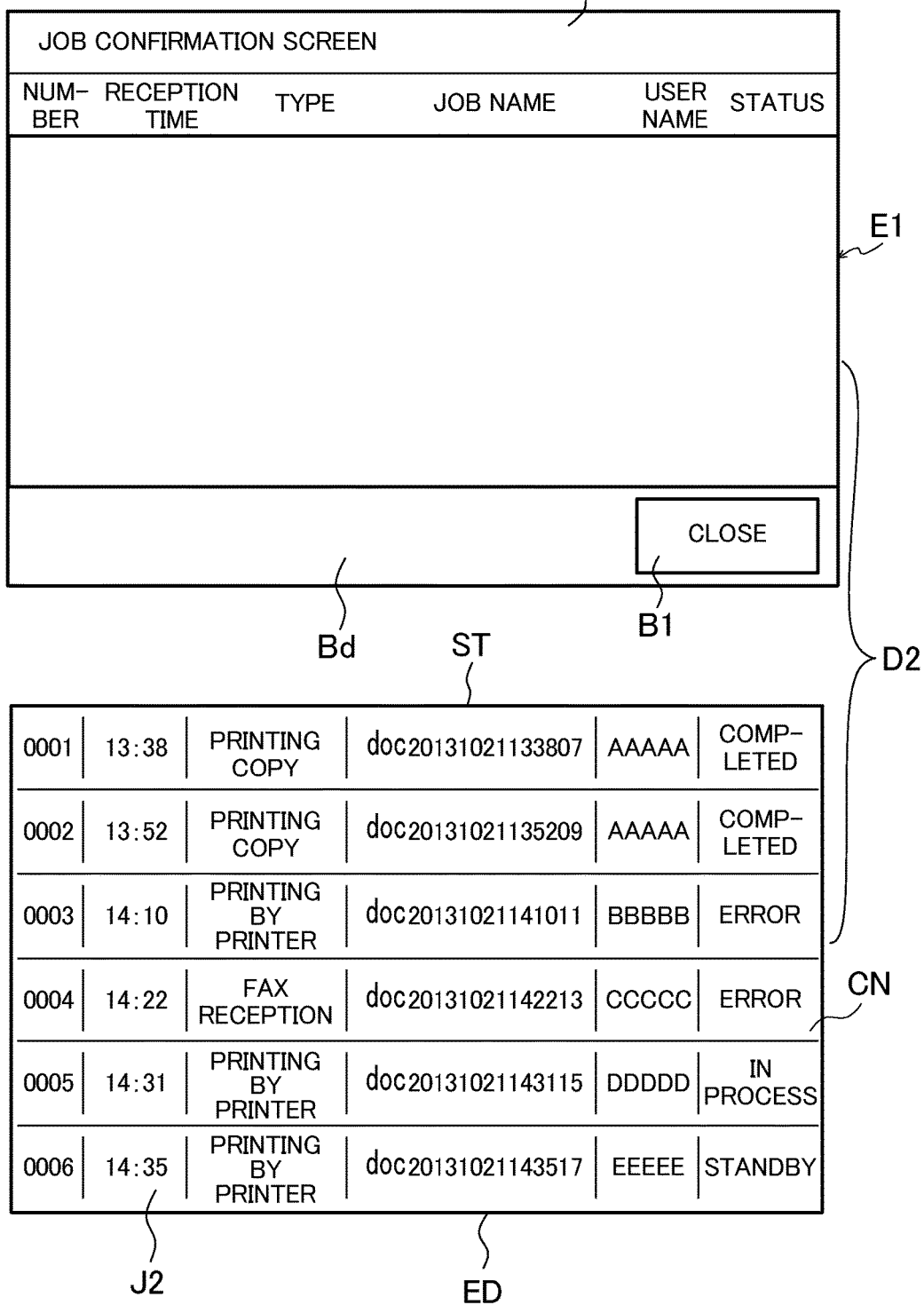

Fig.5A

JOB CONFIRMATION SCREEN — Bu

| NUM-BER | RECEPTION TIME | TYPE | JOB NAME | USER NAME | STATUS |
|---|---|---|---|---|---|
| 0003 | 14:10 | PRINTING BY PRINTER | doc20131021141011 | BBBBB | ERROR |
| 0004 | 14:22 | FAX RECEPTION | doc20131021142213 | CCCCC | ERROR |
| 0005 | 14:31 | PRINTING BY PRINTER | doc20131021143115 | DDDDD | IN PROCESS |
| 0006 | 14:35 | PRINTING BY PRINTER | doc20131021143517 | EEEEE | STANDBY |

[CLOSE] — B1

JOB CONFIRMATION SCREEN — Bu

| NUM-BER | RECEPTION TIME | TYPE | JOB NAME | USER NAME | STATUS |
|---|---|---|---|---|---|
| 0001 | 13:38 | PRINTING COPY | doc20131021133807 | AAAAA | COMPLETED |
| 0002 | 13:52 | PRINTING COPY | doc20131021135209 | AAAAA | COMPLETED |
| 0003 | 14:10 | PRINTING BY PRINTER | doc20131021141011 | BBBBB | ERROR |
| 0004 | 14:22 | FAX RECEPTION | doc20131021142213 | CCCCC | ERROR |

[CLOSE] — B1

E1, D2, J2, Bd

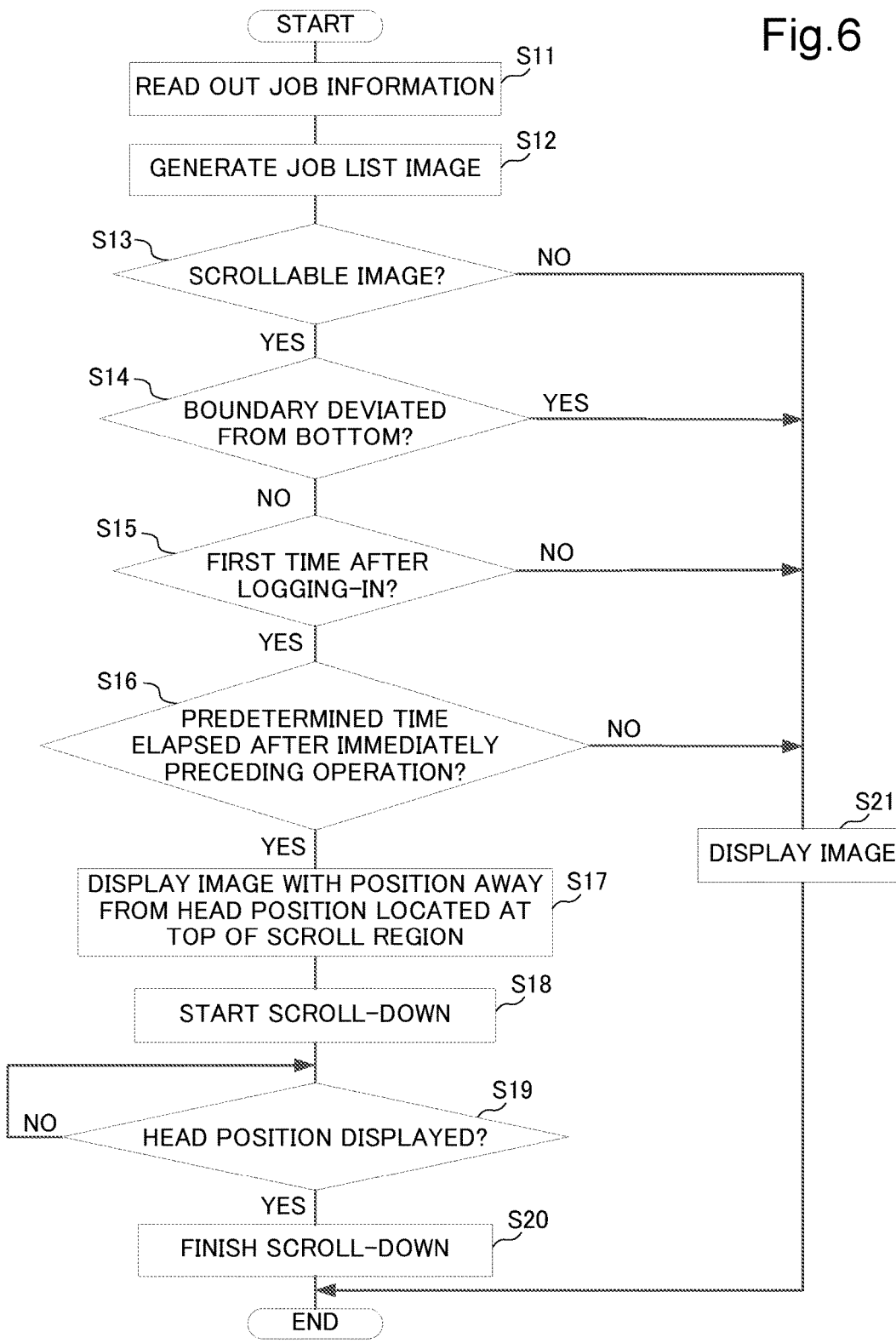

Fig.7A

JOB CONFIRMATION SCREEN (Bu)

| NUM-BER | RECEPTION TIME | TYPE | JOB NAME | USER NAME | STATUS |
|---|---|---|---|---|---|
| 0001 | 13:38 | PRINTING COPY | doc20131021133807 | AAAAA | COMPLETED |
| 0002 | 13:52 | PRINTING COPY | doc20131021135209 | AAAAA | COMPLETED |
| 0003 | 14:10 | PRINTING BY PRINTER | doc20131021141011 | BBBBB | ERROR |
| 0004 | 14:22 | FAX RECEPTION | doc20131021142213 | CCCCC | ERROR |

[CLOSE] (B1)

JOB CONFIRMATION SCREEN (Bu)

| NUM-BER | RECEPTION TIME | TYPE | JOB NAME | USER NAME | STATUS |
|---|---|---|---|---|---|
| 0001 | 13:38 | PRINTING COPY | doc20131021133807 | AAAAA | COMPLETED |
| 0002 | 13:52 | PRINTING COPY | doc20131021135209 | AAAAA | COMPLETED |
| 0003 | 14:10 | PRINTING BY PRINTER | doc20131021141011 | BBBBB | ERROR |
| 0004 | 14:22 | FAX RECEPTION | doc20131021142213 | CCCCC | ERROR |
| 0005 | 14:31 | PRINTING | doc20131021141011 | DDDDD | IN |

[CLOSE] (B1)

PRINT JOB — im1

| | | | | | |
|---|---|---|---|---|---|
| 0001 | 13:38 | PRINTING COPY | doc20131021133809 | AAAAA | COMPLETED |
| 0002 | 13:45 | FAX RECEPTION | doc20131021134511 | BBBBB | COMPLETED |
| 0003 | 14:08 | PRINTING BY PRINTER | doc20131021140813 | CCCCC | ERROR |
| 0004 | 14:15 | PRINTING BY PRINTER | doc20131021141515 | DDDDD | ERROR |

H1 brackets the four print job rows.

TRANSMISSION JOB — im2

| | | | | | |
|---|---|---|---|---|---|
| 0005 | 13:30 | FAX RECEPTION | doc20131021133008 | BBBBB | COMPLETED |
| 0006 | 14:18 | FAX RECEPTION | doc20131021141810 | EEEEE | IN PROCESS |
| 0007 | 14:26 | FAX RECEPTION | doc20131021142612 | AAAAA | STANDBY |

H2 brackets the three transmission job rows.

STORAGE JOB — im3

| | | | | | |
|---|---|---|---|---|---|
| 0008 | 14:01 | SCAN AND STORE | doc20131021140103 | GGGGG | COMPLETED |

H3 brackets the storage job row.

JOB CONFIRMATION SCREEN

| NUMBER | RECEPTION TIME | TYPE | JOB NAME | USER NAME | STATUS |
|---|---|---|---|---|---|
| 0004 | 14:22 | FAX RECEPTION | doc20131021142213 | CCCCC | ERROR |
| 0005 | 14:31 | PRINTING BY PRINTER | doc20131021143115 | DDDDD | IN PROCESS |
| 0006 | 14:35 | PRINTING BY PRINTER | doc20131021143517 | EEEEE | STANDBY |

[ CLOSE ]

Fig.10B

JOB CONFIRMATION SCREEN

| NUMBER | RECEPTION TIME | TYPE | JOB NAME | USER NAME | STATUS |
|---|---|---|---|---|---|
| 0001 | 13:38 | PRINTING COPY | doc20131021133807 | AAAAA | COMPLETED |
| 0002 | 13:52 | PRINTING COPY | doc20131021135209 | AAAAA | COMPLETED |
| 0003 | 14:10 | PRINTING BY PRINTER | doc20131021141011 | BBBBB | ERROR |
| 0004 | 14:22 | FAX RECEPTION | doc20131021142213 | CCCCC | ERROR |

[ CLOSE ]

Fig.11A

JOB CONFIRMATION SCREEN — Bu

| NUMBER | RECEPTION TIME | TYPE | JOB NAME | USER NAME | STATUS |
|---|---|---|---|---|---|
| STORAGE JOB | | | | | |
| 0008 | 14:01 | SCAN AND STORE | doc20131021140103 | GGGGG | COMPLETED |

[ CLOSE ] — B1

JOB CONFIRMATION SCREEN — Bu

| NUMBER | RECEPTION TIME | TYPE | JOB NAME | USER NAME | STATUS |
|---|---|---|---|---|---|
| PRINT JOB | | | | | |
| 0001 | 13:38 | PRINTING COPY | doc20131021133809 | AAAAA | COMPLETED |
| 0002 | 13:45 | FAX RECEPTION | doc20131021134511 | BBBBB | COMPLETED |
| 0003 | 14:08 | PRINTING BY PRINTER | doc20131021140813 | CCCCC | ERROR |

[ CLOSE ] — B1

H1, E1, D3, J3, Bd

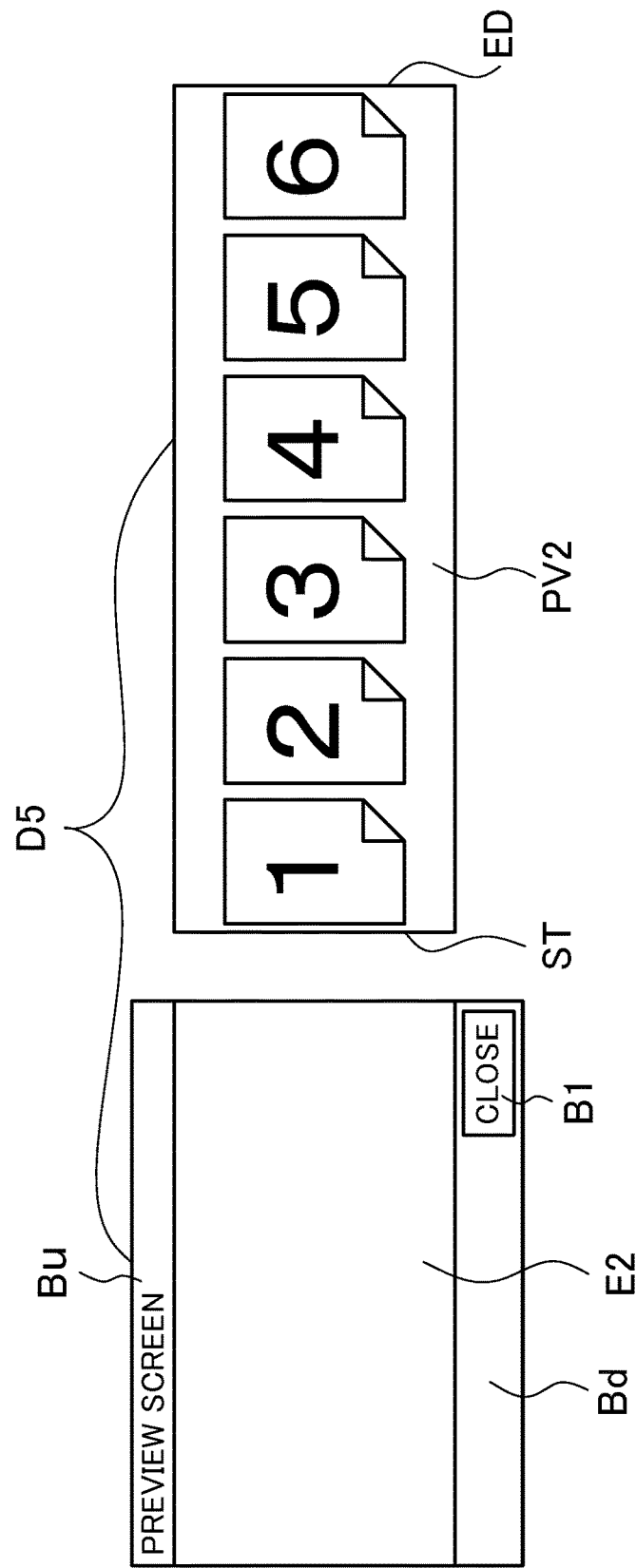

DISPLAY DEVICE AND NON-TRANSITORY COMPUTER-READABLE RECORDING MEDIUM HAVING DISPLAY CONTROL PROGRAM RECORDED THEREON

INCORPORATION BY REFERENCE

This application claims priority to Japanese Patent Application No. 2016-069366 filed on Mar. 30, 2016 and No. 2016-141754 filed on Jul. 19, 2016, the entire disclosure of which are incorporated herein by reference.

BACKGROUND

The present disclosure relates to a display device, and a non-transitory computer-readable recording medium having a display control program recorded thereon, and in particular to a technique to scroll an image displayed on a display section.

Display devices thus far developed include a type that displays a scrollable screen on a display section according to touch operations made by a user on a display screen of the display section. The scrollable display realized according to the touch operation such as swiping is intuitively recognizable and easy to operate, and also allows the display of a scroll bar to be reduced in size or even omitted. Therefore, the display region of images in the display section can be increased.

However, when the display of the scroll bar is small or unavailable, the user may fail to notice that the display screen can be scrolled, in other words that still there are images that can be further displayed, though not currently displayed on the display region of the display section. For example, some of image forming apparatuses are configured to display a list containing a plurality of items of job information listed in a predetermined order. Although a plurality of job names are listed as job information in the order of the time of reception, the user may fail to notice the undisplayed, in other words hidden, job information when the display of the scroll bar is small or unavailable.

Therefore, a display device has been proposed that, when displaying a scrollable image in the display section, once scrolls up the image so that the end of the image is displayed.

SUMMARY

The disclosure proposes further improvement of the foregoing technique.

In an aspect, the disclosure provides a display device including a display section and a control unit. An image is displayed in the display section. The control unit includes a processor that executes an operation program to thereby control a display in the display section, and receives an operation instruction made by a user by touching the display section. The control unit displays, upon deciding that an image to be displayed in the display section is a scrollable image larger than a predetermined display region of the display section, and an entirety of which can be displayed in the display region by scrolling the image in a vertical or horizontal direction in a display screen of the display section, a portion of the scrollable image in the display region, the portion being shifted in the vertical direction or horizontal direction to a predetermined position away from a head position, and then displays, in the display region, the scrollable image scrolled until the head position thereof appears at an end of the display region in a direction of the shifting.

In another aspect, the disclosure provides a non-transitory computer-readable recording medium containing a display control program that causes a computer to act as a control unit that controls a display in a display section and receives an operation instruction made by a user by touching the display section. The display control program further causes the computer to display, upon deciding that an image to be displayed in the display section is a scrollable image larger than a predetermined display region of the display section, and an entirety of which can be displayed in the display region by scrolling the image in a vertical or horizontal direction in a display screen of the display section, a portion of the scrollable image in the display region, the portion being shifted in the vertical direction or horizontal direction to a predetermined position away from a head position, and then to display, in the display region, the scrollable image scrolled until the head position thereof appears at an end of the display region in a direction of the shifting.

BRIEF DESCRIPTION OF THE DRAWINGS

FIG. 3 is a schematic drawing showing an example of a display image;

FIG. 4 is a schematic drawing showing another example of the display image;

FIG. 5A and FIG. 5B are schematic drawings each showing an example of the display image displayed in a display section, FIG. 5A representing a state at the time of start of scrolling, and FIG. 5B representing a state at the end of the scrolling;

FIG. 6 is a flowchart showing a display process performed by the image forming apparatus according to a second embodiment;

FIG. 7A and FIG. 7B are schematic drawings each showing an example of the display image, FIG. 7A representing the case where the bottom of the display region accords with a boundary of job information, and FIG. 7B representing the negative case;

FIG. 9 is a schematic drawing showing an example of the display image;

FIG. 10A and FIG. 10B are schematic drawings each showing an example of the display image displayed in the display section, FIG. 10A representing a state at the time of start of scrolling, and FIG. 10B representing a state at the end of the scrolling;

FIG. 11A and FIG. 11B are schematic drawings each showing an example of the display image displayed in the display section, FIG. 11A representing a state at the time of start of scrolling, and FIG. 11B representing a state at the end of the scrolling;

FIG. 13 is a schematic drawing showing another example of the display image.

DETAILED DESCRIPTION

Figure 1:
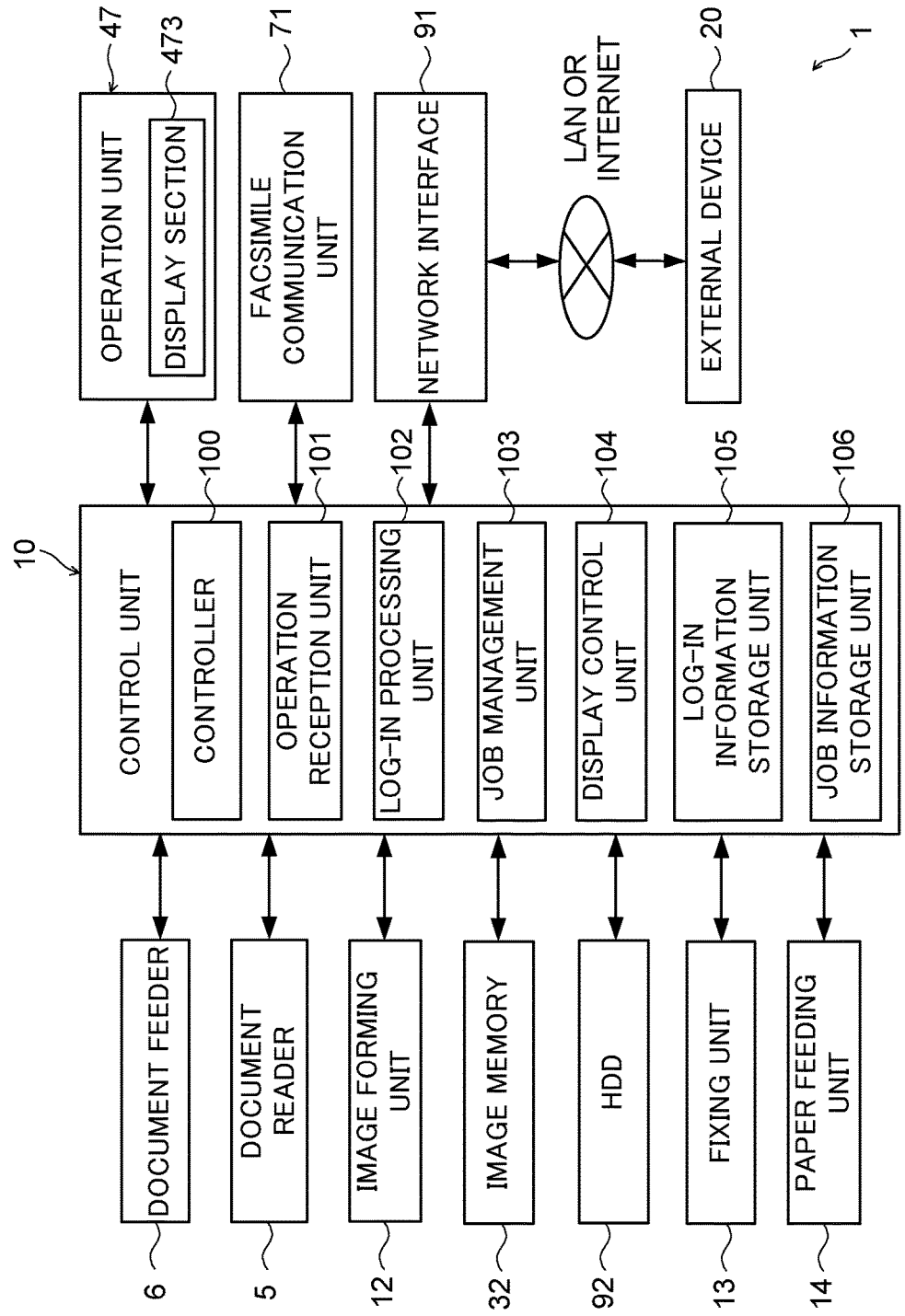
FIG. 1 is a functional block diagram showing an internal configuration of an image forming apparatus, exemplifying the display device, according to a first embodiment of the disclosure.

Hereafter, a display device and a display control program according to embodiments of the disclosure will be described with reference to the drawings. FIG. 1 is a functional block diagram showing an internal configuration of an image forming apparatus, exemplifying the display device, according to a first embodiment of the disclosure.

The display device according to the first embodiment can be exemplified by an image forming apparatus 1. The image forming apparatus 1 is configured to execute a plurality of functions including, for example, a copying function, a printing function, a scanning function, and a facsimile function. The image forming apparatus 1 includes a control unit 10, a document feeder 6, a document reader 5, an image forming unit 12, an image memory 32, a hard disk drive (HDD) 92, a fixing unit 13, a paper feeding unit 14, an operation unit 47, a facsimile communication unit 71, and a network interface 91.

The HDD 92 is a large-capacity storage device for storing, for example, the source image read by the document reader 5, as well as a display control program according to the embodiment of the disclosure.

The operation unit 47 is used to input user's instructions to execute the image forming operation, document reading operation, and so forth, with respect to operations and processes that the image forming apparatus 1 is configured to perform. The operation unit 47 includes a display section 473 for displaying operation guides for the user. In this embodiment the display section 473 is constituted of a touch panel, so that the user can operate the image forming apparatus 1 by touching the buttons or keys displayed in the display section 473.

The control unit 10 includes a processor such as a central processing unit (CPU), a random access memory (RAM), a read only memory (ROM), and a single-purpose hardware circuit. The control unit 10 includes a controller 100, an operation reception unit 101, a log-in processing unit 102, a job management unit 103, a display control unit 104, a log-in information storage unit 105, and a job information storage unit 106.

The control unit 10 is configured to act, according to a control program installed in the HDD92, as the controller 100, the operation reception unit 101, the log-in processing unit 102, the job management unit 103, the display control unit 104, the log-in information storage unit 105, and the job information storage unit 106. Here, the controller 100 and other components may each be constituted in the form of a hardware circuit, instead of being performed by the control unit 10 according to the control program. This also applies to other embodiments, unless otherwise specifically noted.

The log-in information storage unit 105 stores therein log-in information including a log-in ID and a password exclusive to the user, required for logging-in in the image forming apparatus 1.

The job information storage unit 106 stores therein job information indicating the details of the job, such as the time of reception and type of the job (e.g., printing a copy, printing by printer, fax reception and printing, fax transmission, and storing scanned data), a job name, a user name, and status (e.g., standby, operation in process, and completed).

The controller 100 serves to control the overall operation of the image forming apparatus 1. The controller 100 is connected to the document feeder 6, the document reader 5, the image forming unit 12, the image memory 32, the HDD 92, the fixing unit 13, the paper feeding unit 14, the operation unit 47, the facsimile communication unit 71, and the network interface 91, so as to control these functional units.

The operation reception unit 101 receives a user operation inputted by the user through the operation unit 47. The display section 473 included in the operation unit 47 has a touch panel function, by means of which a touch operation made by the user on the display screen of the display section 473, such as swiping or flicking gesture, is inputted as the user operation, so that the operation reception unit 101 receives the user operation.

The log-in processing unit 102 decides, when the operation reception unit 101 receives the log-in information inputted by the user operation made through the operation unit 47, whether the inputted log-in information is stored in the log-in information storage unit 105, and permits the user to log-in in the image forming apparatus 1, upon deciding that the log-in information is stored.

The job management unit 103 stores the job information indicating the job of the image forming apparatus 1 in the job information storage unit 106, and updates the job information stored therein according to a change in status of the job.

The display control unit 104 controls the display in the display section 473. For example, when the operation reception unit 101 receives a request from the user to scroll the display in the display section 473, the display control unit 104 scrolls the image displayed in the display section 473, in accordance with the request.

Figure 2:
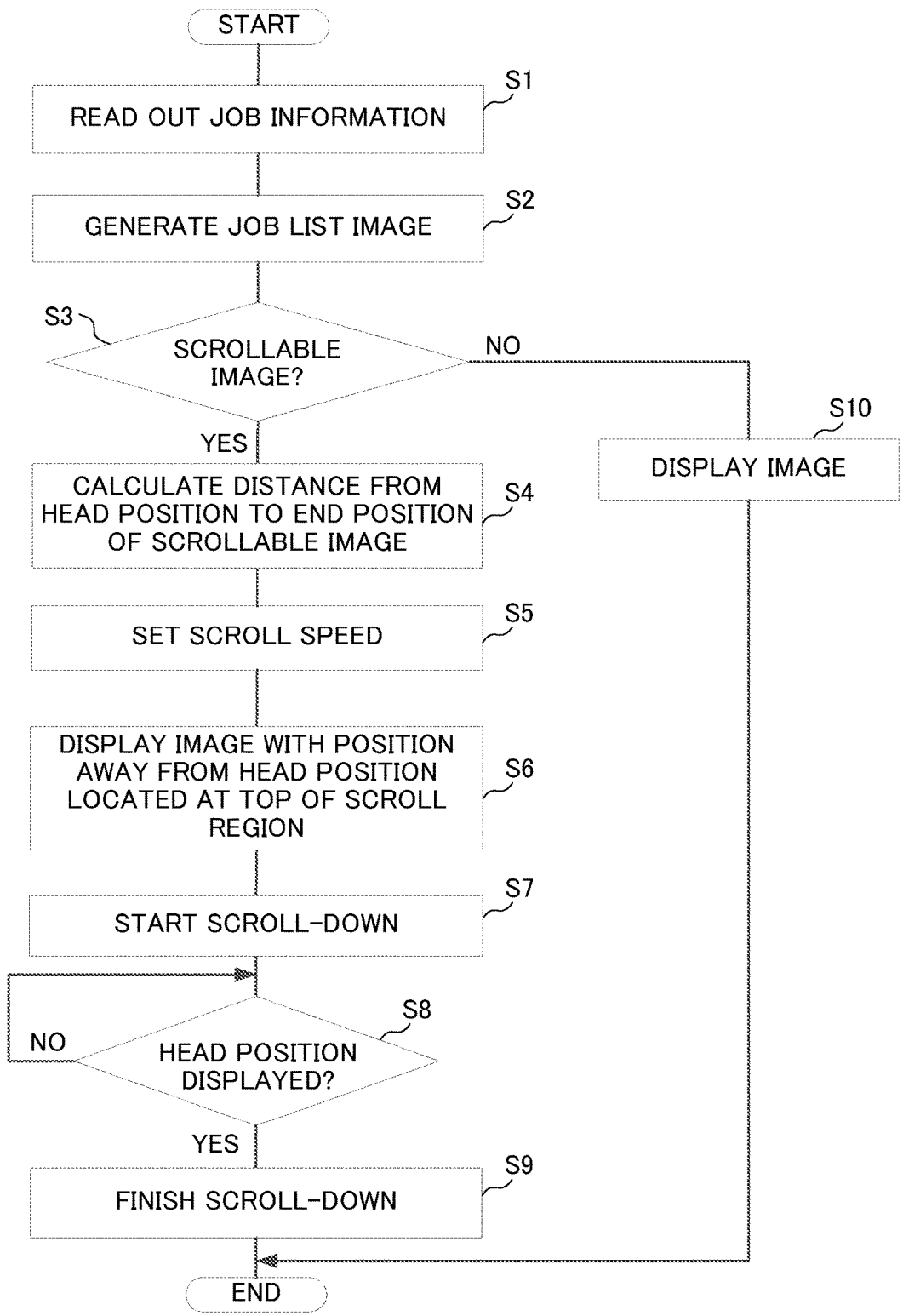
FIG. 2 is a flowchart showing a display process performed by the image forming apparatus according to the first embodiment.

A display process performed by the image forming apparatus 1 will be described hereunder. FIG. 2 is a flowchart showing the display process performed by the image forming apparatus 1. It will be assumed that in this process the user has requested a display of a job list.

When the operation reception unit 101 receives the request to display the job list from the user, the controller 100 reads out the job information from the job information storage unit 106 (S1), and the display control unit 104 generates a job list image representing the job information which has been read out (S2).

FIG. 3 is a schematic drawing showing an example of the display image containing the job list image. The display image D1 includes a job list image J1 composed of a plurality of items (number, reception time, job type, job name, user name, and status), an upper bar Bu showing the title "Job Confirmation Screen" and the items, and a lower bar Bd including a button B1 denoted as "close" for closing the display image D1. The job list image J1 fits inside a scroll region E1 (FIG. 4) of the display image D1. The scroll region exemplifies the predetermined display region in the disclosure.

However, when the display control unit 104 generates a job list image that contains a large number of items of job information, the job list image may protrude from the scroll region in the display image. FIG. 4 illustrates a job list image J2 containing a larger number of items of the job information than the job list image J1. A display image D2 shown in FIG. 4 includes the job list image J2, the scroll region E1 for scrolling the job list image J2, the upper bar Bu, and the lower bar Bd. In FIG. 4, codes ST and ED respectively denote the head position and the end position of the job list image J2.

Then the display control unit 104 decides whether the job list image generated at S2 fits inside the scroll region E1, in other words whether the job list image is a scrollable image, the entirety of which is unable to be displayed in the scroll region E1 unless the image is scrolled (S3). Upon deciding that the job list image generated at S2 is a scrollable image (YES at S3), the display control unit 104 calculates the distance L1 from the head position ST to the end position ED of the scrollable image (job list image J2 in FIG. 4) (S4).

The display control unit 104 then sets a scroll speed V1, so as to make the scroll speed slower, the longer the distance L1 calculated at S4 is (S5). For example, the display control unit 104 may determine a reference value of the scroll speed in advance, and calculate the scroll speed V1 with an equation "V1=reference value/L1".

The display control unit 104 displays the display image D2 including the job list image J2, the upper bar Bu, and the lower bar Bd in the display section 473, such that, as shown in FIG. 5A, a predetermined position away from the head position ST of the job list image J2, which is a scrollable image, is located at the upper end of the scroll region E1 (S6). In this embodiment, the predetermined position is set at half a page away from the head position ST. In the job list image J2, for example, the predetermined position corresponds to the position of the job information numbered as "0003".

After the mentioned image is displayed, the display control unit 104 starts to scroll down the job list image J2 being displayed, at the scroll speed V1 determined at S5 (S7). For example, the display control unit 104 scrolls down the image until the head position ST of the job list image J2 appears at the upper end of the scroll region E1, as shown in FIG. 5B (YES at S8). At this point, the display control unit 104 stops the scroll-down operation (S9).

In contrast, upon deciding that the job list image generated at S2 is not a scrollable image (NO at S3), the display control unit 104 displays the image containing the job list image as it is, in the scroll region E1 of the display section 473 (S10). In other words, the display control unit 104 does not display the portion of the image representing the predetermined position or scroll down the image. For example, when the job list image only includes four items of job information like the job list image J1 shown in FIG. 3, the display control unit 104 displays the display image D1 containing the job list image J1 as it is, in the display section 473.

In generally known display devices, an image to be displayed is once scrolled up until the end position of the image is displayed, and hence the user has to make an instruction to scroll down the image so as to display the head position of the image in the screen of the display section, in order to operate the device upon confirming the content of the image from the head position. Such an operation is troublesome to the user.

In contrast, according to the first embodiment, when the display section 473 is to display an image containing a job list image, the entirety of which is unable to be displayed at a time in the scroll region E1, the display control unit 104 displays the portion of the job list image, which is a scrollable image, including the predetermined position in the scroll region E1, and then scrolls down the job list image in the display section 473. Such an arrangement allows the user to easily recognize that the job list image includes a portion yet to be displayed in the display section 473.

In addition, when the scroll-down operation is finished the head position of the job list image is displayed in the display section 473, and therefore the user can confirm the content of the job list image from the head position without the need to perform any displaying operation, before inputting an instruction necessary for image forming to the operation unit 47. Thus, the user can easily recognize the content of the job list image, without the need to perform the troublesome operation.

According to the foregoing embodiment, further, the display control unit 104 changes the scroll speed V1 depending on the length of the scrollable image (job list image J2), which enables the user to recognize the length (size) of the job list image in view of scroll speed in the display section 473.

Hereunder, a second embodiment of the display process performed by the image forming apparatus 1 will be described. FIG. 6 is a flowchart showing the display process performed by the image forming apparatus according to the second embodiment. The description of the same steps as those of the first embodiment will not be repeated.

Whereas in the first embodiment the display control unit 104 once displays the portion of the job list image (scrollable image) shifted downward to the predetermined position away from the head position in the scroll region of the display section 473, and then scrolls down the job list image, the second embodiment is different from the first embodiment in that a limit is specified with respect to the execution of the display process. It will be assumed that in the second embodiment the user has inputted the log-in ID and the password through the operation unit 47, and the log-in processing unit 102 has permitted the user to log-in, before S11.

In the second embodiment, when the display control unit 104 decides that the generated job list image is a scrollable image (YES at S13), the display control unit 104 further decides whether, when the scrollable image is displayed in the scroll region with the head position located at the upper end, the trailing end of the scrollable image displayed in the scroll region is cut off halfway of an image representing any item of the job information. In other words, the display control unit 104 decides whether the bottom of the scroll region E1 is deviated from a boundary between the images representing the job information (S14). Here, FIG. 7A illustrates the case where the bottom of the scroll region E1 accords with the boundary between the images representing the job information, and FIG. 7B illustrates the case where the bottom of the scroll region E1 is deviated from the boundary between the images representing the job information. When the bottom of the scroll region E1 is deviated from the boundary between the images representing the job information as shown in FIG. 7B, the user can easily notice that the job list image J2 includes a portion yet to be displayed in the scroll region E1, despite the scroll-up operation not being performed.

Upon deciding that the scroll region E1 is deviated from the boundary between the images representing the job information (YES at S14), the display control unit 104 displays the image containing the job list image as it is in the scroll region E1 of the display section 473 (S21). Thus, the job list image is displayed without being scrolled down.

In contrast, when it is decided that the bottom of the scroll region E1 accords with the boundary between the images representing the job information (NO at S14), the display control unit 104 decides whether the decision of NO at S14 has been made for the first time after the logging-in (S15).

Upon deciding that it is not the first time that the decision of NO at S14 has been made after the logging-in (NO at S15), in other words the scroll-down display was performed once, the display control unit 104 displays the job list image without the scroll-down operation (S21). This is because the user already visually confirmed the image displayed with the scroll-down operation, and is hence presumed to be already aware that the job list image currently displayed includes a portion yet to be displayed in the scroll region.

In contrast, when it is decided that the decision of NO at S14 has been made for the first time after the logging-in (YES at S15), the display control unit 104 further decides whether a predetermined time (e.g., two minutes) has elapsed after the immediately preceding operation instruction received by the operation reception unit 101 (S16).

Upon deciding that the predetermined time (e.g., two minutes) has not yet elapsed after the immediately preceding operation instruction (NO at S16), the display control unit 104 displays the job list image without the scroll-down operation (S21).

In contrast, when it is decided that the predetermined time has elapsed after the immediately preceding operation instruction (YES at S16), the display control unit 104 displays the display image D2 containing the job list image J2 (FIG. 4) in the display section 473 such that, as shown in FIG. 5A, the predetermined position away from the head position ST of the job list image J2, which is a scrollable image, is located at the upper end of the scroll region E1 (S17), and then starts to scroll down the job list image J2 so as to display the upper portion thereof is displayed (S18). The display control unit 104 performs such a display with the scroll-down operation because the predetermined time has elapsed after the user visually confirmed the image displayed with the scroll-down operation, and hence may fail to immediately recall whether the job list image currently displayed includes a portion yet to be displayed in the scroll region.

In the second embodiment, the scrolling is not performed each time but performed only when necessary, for example when the user is likely to fail to recognize that the job list image currently displayed includes a portion yet to be displayed in the scroll region. Therefore, the scroll-down operation is skipped when the user is presumably not in need of the scroll-down display, so that the user can be exempted from the trouble of viewing an undesired display. However, the display with the scroll-down operation is surely performed when it is really necessary, and therefore the user recognizes without fail that the job list image includes a portion yet to be displayed in the scroll region.

Figure 8:
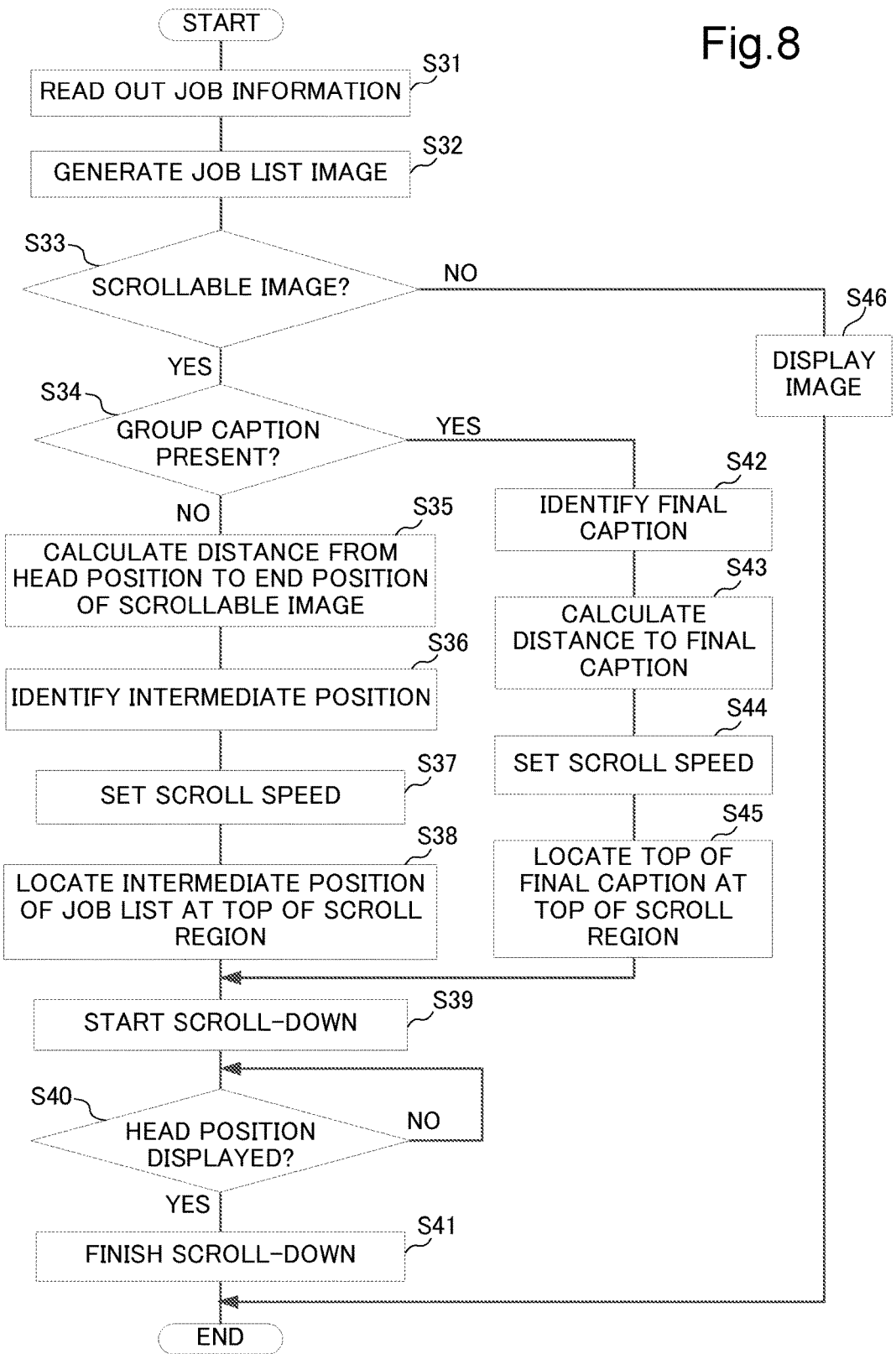
FIG. 8 is a flowchart showing a display process performed by the image forming apparatus according to a third embodiment.

Hereunder, a third embodiment of the display process performed by the image forming apparatus 1 will be described. FIG. 8 is a flowchart showing the display process performed by the image forming apparatus according to the third embodiment. The description of the same steps as those of the first or second embodiment will not be repeated.

The third embodiment is different from the first and second embodiments in variably determining the position from which the scroll-down operation is to be started, according to the length of the job list image that is a scrollable image and, further, in performing a different display process when the job list image is composed of a plurality of image groups.

In the third embodiment, when the display control unit 104 decides that the generated job list image is a scrollable image (YES at S33), the display control unit 104 further decides whether the job list image is composed of a plurality of image groups, and whether each of the image groups includes a caption image (FIG. 9 to be described below) (S34).

FIG. 9 illustrates an example in which the job list image is composed of a plurality of image groups, each of which includes a caption image. A job list image J3 shown in FIG. 9 includes a plurality of items of job information, and the plurality of items of job information are classified into three image groups (print job mage group H1, transmission job mage group H2, storage job mage group H3), each of which includes a caption image. In the illustrated example, the print job image group H1 includes a caption image im1, the transmission job image group H2 includes a caption image im2, and the storage job image group H3 includes a caption image im3.

Upon deciding that the job list image is generated so as to include a plurality of image groups each having a caption image (YES at S34), the display control unit 104 identifies a caption image (final caption) located farthest from the head position ST of the job list image J3 (FIG. 9) (S42), and calculates the distance L3 from the head position ST to the farthest caption image (final caption) (S43).

The display control unit 104 then sets a scroll speed V3, so as to make the scroll speed faster the longer the distance L3 calculated at S43 is, in other words so that it takes a fixed time before the head position ST of the job list image J3 appears at the upper end of the scroll region irrespective of the length of the distance L3 (S44). The display control unit 104 may calculate the scroll speed V3, for example, with an equation "V3=L3/scroll display time".

First, the display control unit 104 displays a display image D3 containing the job list image J3 in the display section 473, such that, as shown in FIG. 11A, the final caption of the job list image J3, i.e., the upper end of the caption image im3 in this example, is located at the upper end of the scroll region E1 (S44).

In contrast, when it is decided that the generated job list image does not include the plurality of image groups each having the caption image (NO at S34), the display control unit 104 calculates the distance L1 from the head position ST of the job list image J2 to the end position ED, with reference to the example of FIG. 4 (S35). Then the display control unit 104 multiplies the calculated distance L1, for example by 0.5, so as to calculate a distance L2 from the head position ST to an intermediate position CN, thereby identifying the intermediate position CN of the job list image J2 (S36).

The display control unit 104 then sets a scroll speed V2, so as to make the scroll speed V2 faster the longer the distance L2 is, in other words so that it takes a fixed time before the head position ST of the job list image J3 appears at the upper end of the scroll region irrespective of the length of the distance L2 (S37). The display control unit 104 may determine a reference value of the scroll speed in advance, and calculate the scroll speed V2, for example with an equation "V2=L2/scroll display reference time".

The display control unit 104 displays the display image D2 containing the job list image J2 in the display section 473, such that, as shown in FIG. 10A, the intermediate position CN of the job list image J2 is located at the upper end of the scroll region E1 (S38).

After the completion of S38, the display control unit 104 starts to scroll down the job list image J2 displayed at this point, at the scroll speed V2 determined at S37 (S39). The display control unit 104 scrolls down the job list image J2, for example until the head position ST thereof appears at the upper end of the scroll region E1 as shown in FIG. 10B (YES at S40), and then finishes the scroll-down operation (S41).

When steps S42 to S45 are followed, the display control unit 104 starts, after the completion of S45, to scroll down the job list image J3 displayed at this point, at the scroll speed V3 determined at S44 (S39). The display control unit 104 scrolls down the job list image J3, for example until the head position ST thereof appears at the upper end of the scroll region E1 as shown in FIG. 11B (YES at S40), and then finishes the scroll-down operation (S41).

In the third embodiment, the scroll speed in the scroll-down operation becomes faster the longer the job list image J2 (distance from the head position ST to the end position ED) is. Such an arrangement facilitates the user to recognize the length of the job list image (size of the hidden portion of the image) according to the scroll speed. In addition, when the job list image includes a plurality of image groups each having the caption image, the user can visually recognize all of the caption images during the scroll-down operation, to thereby recognize the structure of the content of the job list image.

Although in this embodiment the display control unit 104 identifies, upon deciding that the job list image is generated so as to include a plurality of image groups, each having a caption image (YES at S34), the caption image located farthest from the head position ST of the job list image J3 (final caption) (S42), and calculates the distance L3 from the head position ST to the farthest caption image (final caption) (S43), the caption image to be identified by the display control unit 104 may be any of the caption images of the second or subsequent image groups from the head position of the job list image. In this case, the setting of the scroll speed based on the distance to the identified caption image may be skipped.

Although the first to the third embodiments refer to the scrolling of the image in the vertical direction, the disclosure is also applicable to the scrolling in the horizontal direction, for example in the case of generating a preview display in which source images read by the document reader 5 are horizontally aligned in the display section 473, or in which images to be formed on a recording medium by the image forming unit 12 are horizontally aligned in the display section 473. Such cases will be described hereunder, as a fourth embodiment.

First, a formation process of preview images constituting the preview display will be described. For example, when the operation reception unit 101 receives an instruction from the user to display a preview of the source images, the controller 100 reads out the source images from the HDD92, and the display control unit 104 generates the preview image containing the source images read out by the controller 100.

Figure 12:
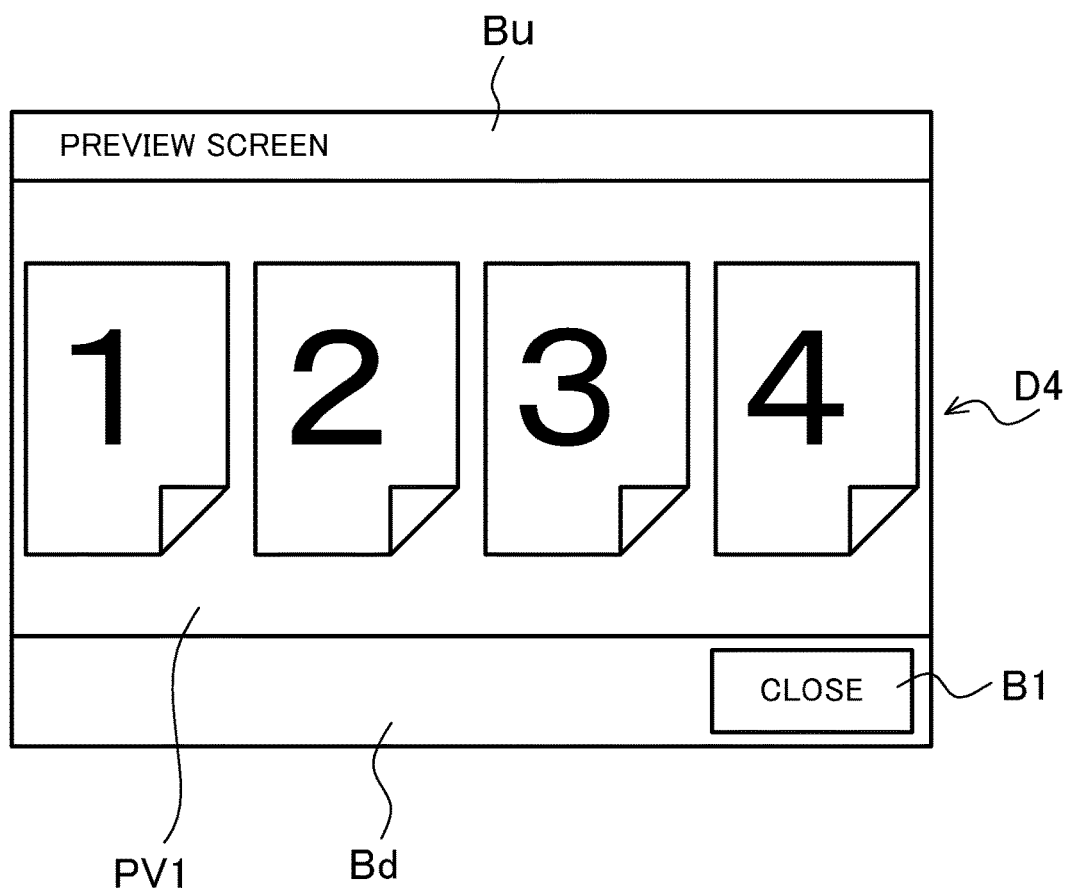
FIG. 12 is a schematic drawing showing an example of the display image.

FIG. 12 is a schematic drawing showing an example of the display image containing the preview image. The display image D4 is composed of a preview image PV1 displaying a plurality of source images for preview, the upper bar Bu displaying a title "preview screen", and the lower bar Bd including the button B1 denoted as "close" for closing the display image D4. The preview image PV1 fits inside a scroll region E2 (FIG. 13) in the display image D4.

However, when the display control unit 104 generates a preview image that contains a large number of source images, the preview image may protrude from the scroll region in the display image. FIG. 13 illustrates a preview image PV2 containing a larger number of source images than the preview image PV1. A display image D5 shown in FIG. 13 includes the preview image PV2, the scroll region E2 for scrolling the preview image PV2, the upper bar Bu, and the lower bar Bd. In FIG. 13, codes ST and ED respectively denote the head position and the end position of the preview image PV2.

Figure 14A:
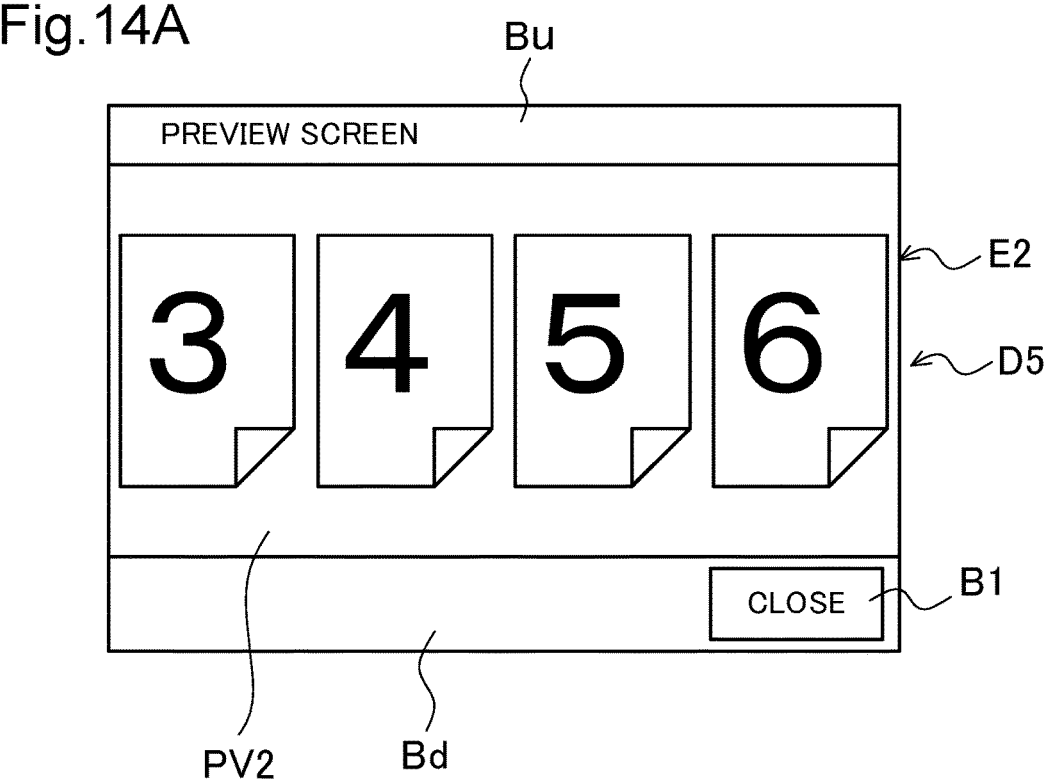
FIG. 14A and FIG. 14B are schematic drawings each showing an example of the display image displayed in the display section, FIG. 14A representing a state at the time of start of scrolling, and FIG. 14B representing a state at the end of the scrolling.

The display control unit 104 displays, upon deciding that the preview image PV2 to be displayed in the display section 473 is a scrollable image larger than the scroll region E2 of the display section 473, and the entirety of which can be displayed in the scroll region E2 by scrolling the preview image PV2 in the horizontal direction, the display image D5 including the preview image PV2, the upper bar Bu, and the lower bar Bd, the upper bar Bu, and the lower bar Bd in the display section 473, such that, as shown in FIG. 14A, a predetermined position away from the head position ST of the scrollable image is located at the left-hand end of the scroll region E2. In this embodiment, the predetermined position is set at half a page away from the head position ST. In the preview image PV2, for example, the predetermined position corresponds to the position of the source image numbered as "3".

Figure 14B:
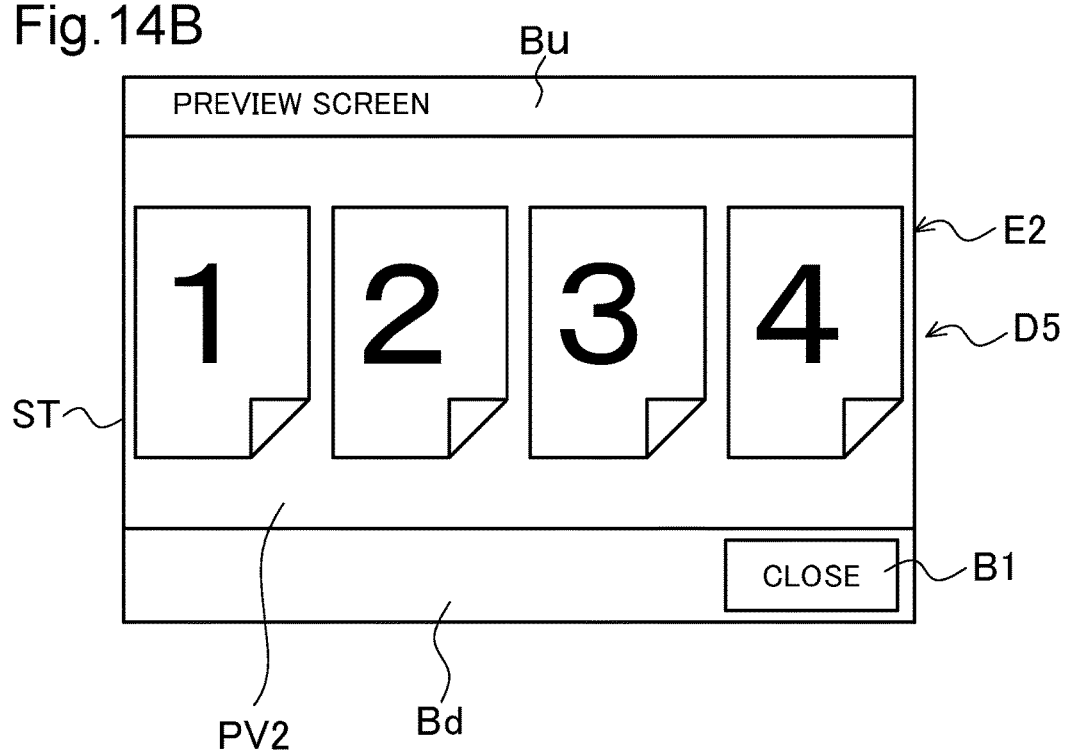

After the mentioned preview image is displayed, the display control unit 104 starts to scroll the preview image PV2 to the right, in order to display the source images hidden in the left side of the scroll region E2, until the head position ST of the preview image PV2 appears at the left-hand end of the scroll region E2, as shown in FIG. 14B. Thus, the scrolling in the horizontal direction also provides the same advantageous effects as those provided by the scrolling in the vertical direction.

The disclosure is not limited to the foregoing embodiments, but may be modified in various manners. Although the foregoing embodiments refer to a multi-function peripheral serving as image forming apparatus as example of the display device according to the disclosure, the disclosure is equally applicable to different types of image forming apparatuses having a copying function, a printing function, a scanning function, or a facsimile function, and to other types of electronic apparatuses.

In the case where the display device includes a plurality of display sections of different sizes, the display section(s) equal to or larger than a predetermined size may include a scroll bar, and the display section(s) smaller than the predetermined size may be without the scroll bar. In this case, the operations according to the foregoing embodiments may be applied to the display section(s) smaller than the predetermined size without the scroll bar, but not to the display section(s) equal to or larger than the predetermined size with the scroll bar.

Further, whether the scroll bar is displayed may be determined depending on the type of the content to be displayed. For example, the display control unit may exclude the scroll bar from images of a first predetermined type such as a preview image, and display the scroll bar in images of a second predetermined type such as various setting screens. In this case, the display control unit may execute the operations according to the foregoing embodiments, when displaying the images of the first predetermined type without the scroll bar.

The configurations and processing according to the foregoing embodiments, described above with reference to FIG. 1 to FIG. 14, are merely exemplary and in no way intended to limit the configurations and processing of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. A display device comprising:
    a display section in which an image is displayed; and
    a control unit including a processor and configured to control, when the processor executes an operation program, a display in the display section and to receive an operation instruction made by a user by touching the display section, wherein the control unit
(i) upon receiving a request to display an image that includes a plurality of partial images each representing different information, decides whether or not the image is a scrollable image larger than a predetermined display region of the display section, and an entirety of which can be displayed in the display region by scrolling the image in a vertical or horizontal direction in a display screen of the display section,
(ii) upon deciding that the image is the scrollable image and deciding that, on an assumption that the image is displayed with a head position of the image located at an end of the display region in a scroll direction, one of the partial images is not cut off halfway by a trailing end of the image displayed in the display region, displays a portion of the image in the display region, the portion being scrolled in the vertical or horizontal direction to a position farthest away from the head position of the image, and then scrolls the image until the head position of the image appears at the end of the display region,
(iii) upon deciding that the image is the scrollable image and deciding that, on the assumption that the image is displayed with the head position of the image located at the end of the display region, one of the partial images is cut off halfway by the trailing end of the image displayed in the display region, displays the image in the display section with the head position thereof located at the end of the display region, instead of displaying the portion and scrolling the image, and
(iv) upon deciding that the image is not the scrollable image, displays the image in the display section with the head position thereof located at the end of the display region, instead of displaying the portion and scrolling the image.

2. The display device according to claim 1,
wherein the control unit displays, upon deciding that the image is the scrollable image larger than the display region, and the entirety of which can be displayed in the display region by scrolling the image in the vertical direction and deciding that, on an assumption that the image is displayed with the head position of the image located at an upper end of the display region, one of the partial images is not cut off halfway by the trailing end of the image displayed in the display region, a portion of the image in the display region, the portion being scrolled downward to the position farthest away from the head position of the image, and then scrolls the image until the head position of the image appears at the upper end of the display region.

3. The display device according to claim 1,
wherein the control unit displays, upon deciding that the image is the scrollable image larger than the display region, and the entirety of which can be displayed in the display region by scrolling the image in the horizontal direction and deciding that, on an assumption that the image is displayed with the head position of the image located at either left or right end of the display region, one of the partial images is not cut off halfway by the trailing end of the image displayed in the display region, a portion of the image in the display region, the portion being scrolled in the horizontal direction to the position farthest away from the head position of the image, and then scrolls the image to right or left until the head position of the image appears at the left or right end of the display region.

4. The display device according to claim 1,
wherein the control unit makes a scroll speed faster, the longer the distance from the head position of the image to the position farthest away therefrom is, so that it takes a fixed time before the head position of the scrollable image appears at the upper end of the display region irrespective of the distance.

5. The display device according to claim 1,
wherein the control unit makes a scroll speed slower, the longer a distance from the head position of the image to an end position thereof is.

6. The display device according to claim 1,
wherein when each of the partial images has a caption image, the control unit sets the portion so as to include the caption image of a second or subsequent partial image from the head position.

7. The display device according to claim 6,
wherein the control unit sets the portion so as to include the caption image farthest from the head position.

8. The display device according to claim 1,
wherein the control unit further performs a log-in process according to identification information exclusive to the user, and displays the portion and scrolls the image, only once after the log-in process of the user.

9. The display device according to claim 1,
wherein the control unit displays the portion and scrolls the image, when a predetermined time elapses after reception of an immediately preceding operation instruction.

10. The display device according to claim 1,
wherein, when the image is of a first predetermined type, the control unit scrolls the image so as to display the image in the display region, instead of displaying a scroll bar in the display section, and when the image is of a second predetermined type, the control unit displays the scroll bar in the display section, instead of scrolling the image so as to display the image in the display region.

11. A non-transitory computer-readable recording medium having a display control program recorded thereon, the display control program being configured to cause a computer to act as a controller that controls a display on a display section and receives an operation instruction made by a user by touching the display section,
the display control program being configured to further cause the computer to
(i) upon receiving a request to display an image that includes a plurality of partial images each representing different information, decide whether or not the image is a scrollable image larger than a predetermined display region of the display section, and an entirety of which can be displayed in the display region by scrolling the image in a vertical or horizontal direction in a display screen of the display section,
(ii) upon deciding that the image is the scrollable image and deciding that, on an assumption that the image is displayed with a head position of the image located at an end of the display region in a scroll direction, one of the partial images is not cut off halfway by a trailing end of the image displayed in the display region, display a portion of the image in the display region, the portion being scrolled in the vertical or horizontal direction to a position farthest away from head position of the image, and then to scroll the image until the head position of the image appears at the end of the display region,
(iii) upon deciding that the image is the scrollable image and deciding that, on the assumption that the image is displayed with the head position of the image located at the end of the display region, one of the partial images is cut off halfway by the trailing end of the image displayed in the display region, display the image in the display section with the head position thereof located at the end of the display region, instead of displaying the portion and scrolling the image, and (iv) upon deciding that the image is not the scrollable image, display the image in the display section with the head position thereof located at the end of the display region, instead of displaying the portion and scrolling the image.

\* \* \* \* \*